United States Patent

[11] 3,566,096

[72] Inventor Harry B. Schultheis, Jr.
Woodland Hills, Calif.

[21] Appl. No. 567,468
[22] Filed July 25, 1966
[45] Patented Feb. 23, 1971
[73] Assignee Pacific Industries, Inc.
New York, N.Y.

[54] DIGITAL RATIOMETER
4 Claims, 5 Drawing Figs.

[52] U.S. Cl. .......... 235/159, 235/151.32, 324/79
[51] Int. Cl. .......... G06f 7/38
[50] Field of Search .......... 235/164, 159

[56] References Cited

UNITED STATES PATENTS

| | | | |
|---|---|---|---|
| 2,926,848 | 3/1960 | Gordon | 235/164(X) |
| 3,230,353 | 1/1966 | Greene et al. | 235/164(X) |
| 3,321,610 | 5/1967 | Currie, Jr. et al. | 235/164(X) |

*Primary Examiner*—Eugene G. Botz
*Attorney*—Harris, Kiech, Russell & Kern

ABSTRACT: A binary coded decimal rate multiplier for computing the ratio of two input decimal numbers comprising a numerator and a denominator. Using conventional coded counters, such as the 1-2-4-8 counter or the 1-2-2-4 counter, a 1-1-2-5 binary code is used as the entry code for the denominator.

INVENTOR
HARRY B. SCHULTHEIS, JR.
BY HIS ATTORNEYS
HARRIS, KIECH, RUSSELL & KERN

INVENTOR
HARRY B. SCHULTHEIS, JR.
BY HIS ATTORNEYS
HARRIS, KIECH, RUSSELL & KERN

DIGITAL RATIOMETER

This invention relates to a new and improved system for determining the ratio of two numbers. General purpose computers are available for performing nearly any mathematical operation, including the calculation of ratios. But these computers are large, complex and expensive. Accordingly it is an object of the present invention to provide a system for computing the ratio of two input numbers, which system is small, simple, and inexpensive and which utilizes conventional counter modules and other digital circuit modules. A further object is to provide various devices for producing the input numbers in binary form.

It is an object of the invention to provide a system in which the denominator and numerator may be introduced in binary code and one which will provide the resultant ratio in binary code, in visual readout and/or electrical code as desired. A further object is to provide a system including means for generating the binary coded numerator and denominator. A particular object of the invention is to provide such a system wherein the numerator may be a multiple of ten, with the ratio being the reciprocal of the denominator. Additional objects include the provision of systems for performing various specific measurements, such as determination of velocity of moving objects and determination of frequency of unknown sources from measurements of their periods.

It is an object of the invention to provide such a system including a binary rate multiplier incorporating a counter and means for indicating the count state of the counter, with a first input for a series of input pulses directed to the counter, a second input for the denominator, and an output, with the output comprising a series of pulses having an average rate equal to the product of the first input pulse rate and the denominator. A further object is to provide such a system including a preset counter with the binary rate multiplier output as the counter input and including means for presetting the numerator and producing an output pulse when the input count corresponds to the preset numerator. An additional object is to provide such a system including control means having the preset counter output pulse as an input, for connecting a series of input pulses to the first input of the multiplier on receipt of a start command and disconnecting the input series when the preset counter output pulse occurs, with the ratio of the numerator and the denominator being the count state of the multiplier counter when the input series is stopped.

It is an object of the invention to provide such a system which can use various counting scales, particularly a decimal scale. An additional object is to provide a binary coded decimal rate multiplier for utilization in the system. A specific object of the invention is to provide such a system wherein the denominator is introduced in a 1-1-2-5 binary code.

It is an object of the invention to provide various measuring systems incorporating the ratio computer and providing for the sharing of various modules including clock pulse sources, counters, control devices, and the like.

The invention also comprises novel combinations and arrangements of parts together with other objects, advantages, features and results, which will more fully appear in the course of the following description.

The drawings merely show and the description merely describes preferred embodiments of the present invention which are given by way of illustration and example.

Figure 1:
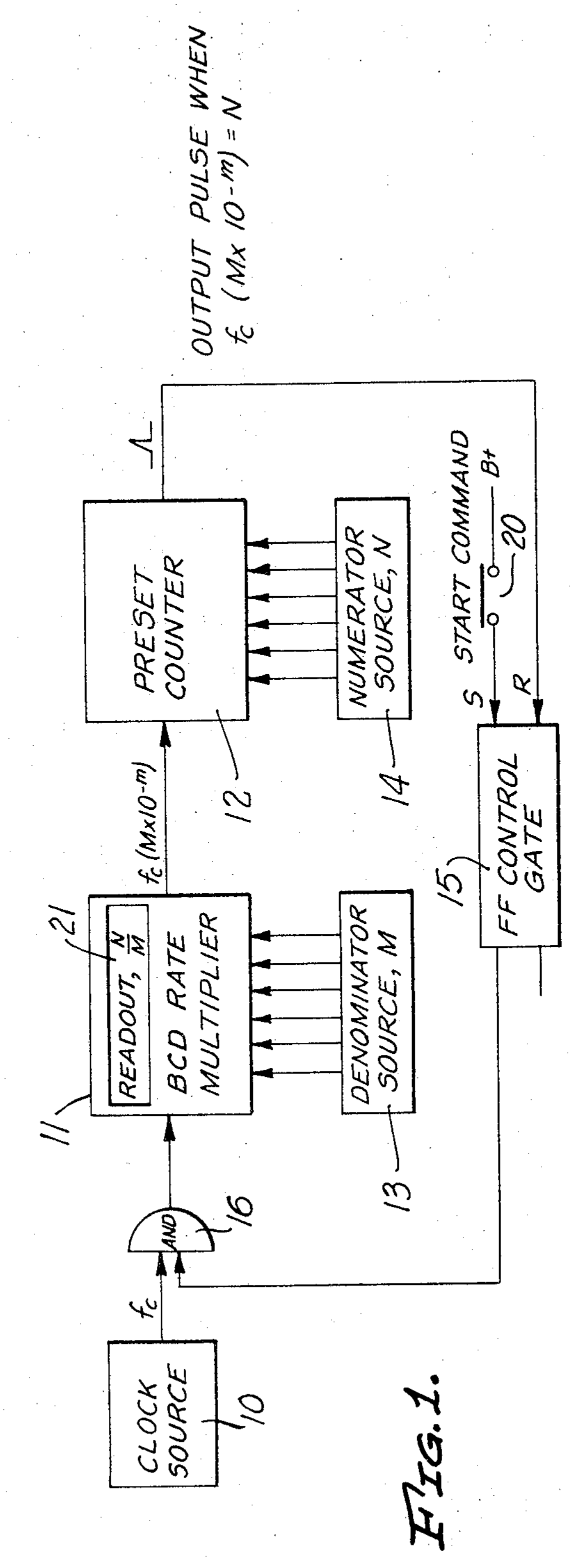
FIG. 1 is an electrical block diagram illustrating a preferred form of the invention.

The system of FIG. 1 includes a clock source 10, a binary coded decimal rate multiplier 11, a preset counter 12, a denominator source 13, a numerator source 14, a flip-flop control gate 15, and an AND gate 16.

Figure 2:
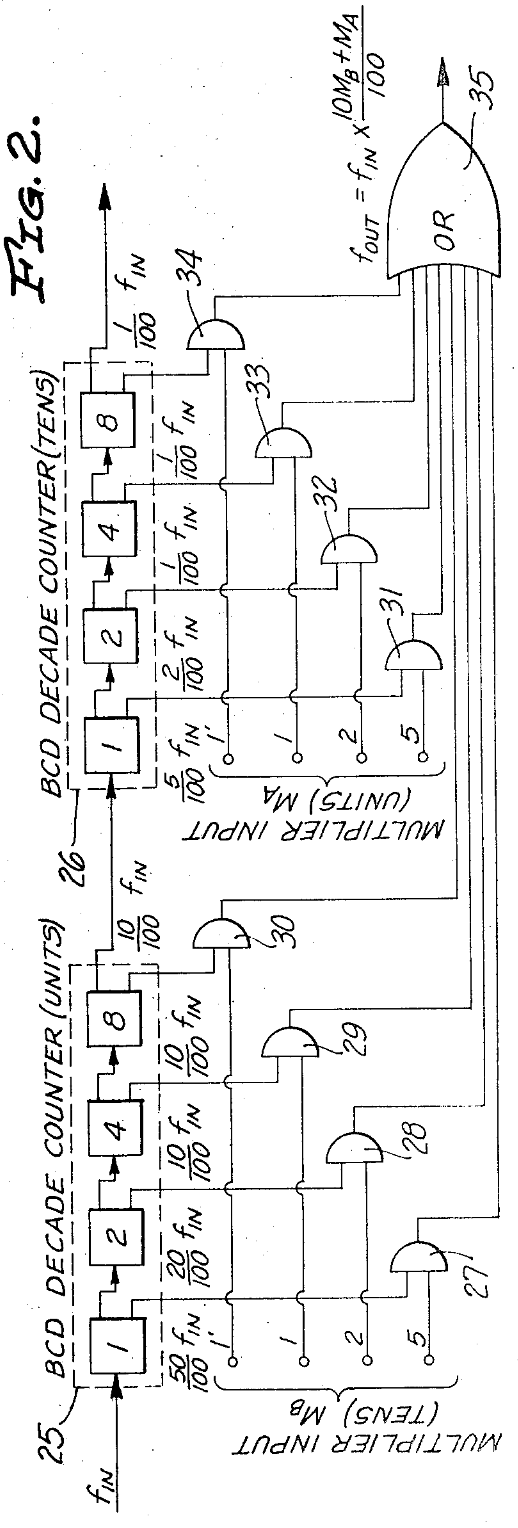
FIG. 2 is a diagram of a two-decade binary coded decimal rate multiplier suitable for use in the system of FIG. 1.

In a binary rate multiplier, the output rate is equal to the input rate times the set number (here the denominator M) divided by $2^n$, where $n$ is the number of binaries in the counter of the rate multiplier. For example, for one scale-of-sixteen counter, the output is equal to the input times M divided by 16. For a binary coded decimal rate multiplier with $m$ decades, the output frequency is equal to the input frequency times M times $10^{-M}$. Conventional binary rate multipliers are described in Handbook of Automation, Computation and Control, Vol. 2, page 29—06, John Wiley & Sons, Inc., and in Digital Linear Interpolation and the Binary Rate Multiplier, Control Engineering, Jun. 1964. A two-decade binary coded decimal rate multiplier is illustrated in FIG. 2 and will be described below. The clock source, preset counter and gates of the system of FIG. 1 are conventional in design and operation. Various conventional devices may be used for the denominator and numerator sources to provide the binary coded inputs to the rate multiplier and preset counter. Typical sources may be manually operated switches, storage registers or other memory devices, and counters at the completion of a count. The stored numbers should be coupled in parallel to the rate multiplier and preset counter and the system of FIG. 1 illustrates a six-decade decimal device, with the six parallel lines indicating parallel transfer of the six-digit binary coded decimal number.

In the operation of the system of FIG. 1, the denominator M is coupled from the source 13 to the rate multiplier 11. The numerator N is coupled from the source 14 to the preset counter 12. The control gate 15 is switched to the set or on state by a start command, which may be provided by a pushbutton 20 which couples a positive voltage pulse to the set input of the gate 15. When the gate 15 is set, the AND gate 16 is open and the pulse series from the clock source 10 is connected through the gate 16 to the input of the counter of the rate multiplier 11. The output of the rate multiplier is connected to the input of the preset counter 12. When the count state at the preset counter reaches the preset number N, the preset counter produces an output pulse which is coupled to the reset input of the gate 15, switching the gate to the reset state. This results in closing of the gate 16 and shutting off of the clock source 10 from the counter of the rate multiplier 11. Now the state of the counter in the rate multiplier is the desired ratio. A visual readout 21 may be incorporated in a rate multiplier to display the counter state, which is the ratio $N/M$. Alternatively, electrical readout may be utilized to transfer the ratio to other instruments for various end uses. The counters of the rate multiplier and preset counter are then reset and the device is ready for computing another ratio.

Expressed in mathematical terms, the output $f_o$ of the rate multiplier is:

$$f_o = f_c(M \times 10^{-m}) \qquad (1)$$

where $f_c$ is the frequency of the clock source, M is the denominator number and $m$ is the number of decades in the rate multiplier.

The gate 16 is open, connecting the clock source to the rate multiplier, for the time required to reach coincidence in the preset counter, which time is:

$$t = N/f_o = N/f_c(M \times 10^{-m}). \qquad (2)$$

The total number of pulses $Q$ entering the rate multiplier as an input to the counter during the time $t$ when the gate 16 is open is:

$$Q = f_c t = f_c N/f_c(M \times 10^{-m}) = N/(M \times 10^{-m}). \qquad (3)$$

Hence the count state of the counter of the rate multiplier, as indicated at the readout 21, is the d3esired ratio. The expression $N/M$ is numerically correct but does not consider the placement of the decimal point. The expression of equation (3), $N/(M \times 10^{-m})$, includes the placement of the decimal point and hence is absolutely correct.

As an example, let:
$f_c = 1 \times 10^6$ c.p.s.,
$M = .72 \times 10^6$
$N = .36 \times 10^6$, and
$m = 6$. Then $$t = \frac{.36 \times 10^6}{(1 \times 10^6)(.72 \times 10^6)(10^{-6})} = 0.5 \text{ sec}$$

and
$Q = (1 \times 10^6)(0.5) = 500{,}000$.

The system may be utilized to compute the reciprocal of a number by utilizing the number as the input $M$ to the rate multiplier and making the input $N$ to the preset counter a multiple of 10. That is, when $N = 1 \times 10n$, where n is the number of decades in the preset counter, $$Q = \frac{1 \times 10^n}{M \times 10^{-m}}$$

Where $n$ and $m$ are equal, $$Q = \frac{1}{M}$$

The quotient or ratio computed by the system is independent of the frequency of the source 10, as can be seen from an inspection of equation (3).

Figures 3, 4, 5:
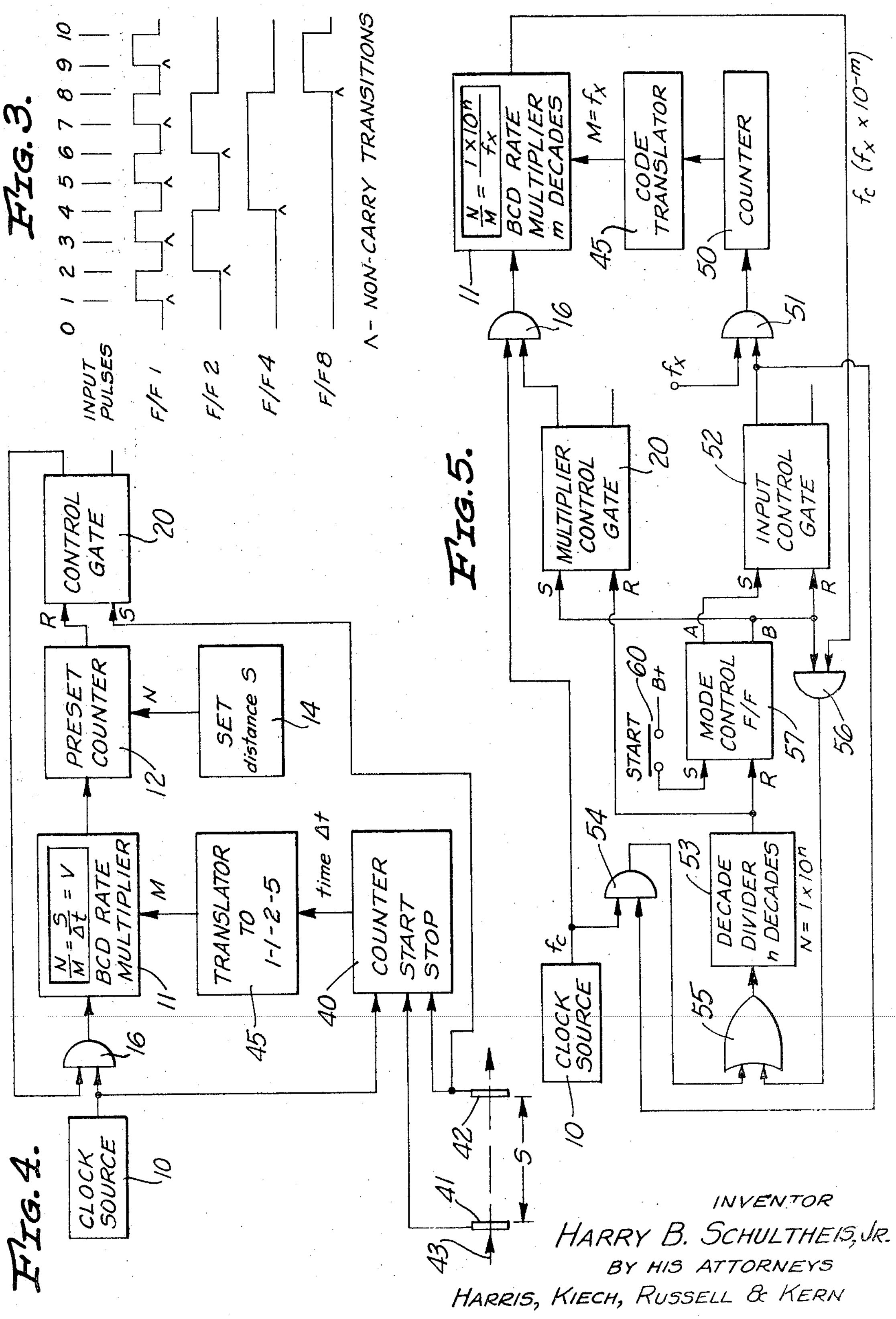
FIG. 3 is a timing diagram illustrating the operation of the circuit of FIG. 2.
FIG. 4 is an electrical block diagram of an alternative form of the system particularly suited for measuring velocity.
FIG. 5 is an electrical block diagram of an alternative form of the system particularly suited for measuring frequency.

A two-decade binary coded decimal rate multiplier is illustrated in FIG. 2. Binary coded decimal decade counters 25, 26 are connected in cascade with the lower order counter preceding the higher order. these may be conventional counters, such as 1-2-4-8 or 1-2-2-4 counters, with a feedback connection to produce a scale of ten or decimal count. 1-2-4-8 counters are illustrated in FIG. 2, but the operation will be the same for other decade counters. The carry AND of each binary is connected as the input to the next binary. The noncarry output of each binary is connected as an input to an AND gate 27—34. The other input for each of the AND gates comes from the denominator source, with the highest order digit of the source connected to the lowest order counter. The source is coded 1-1-2-5, with the 5 line connected to the gate with the noncarry output of the first binary, the 2 line connected to the gate with the noncarry output of the second binary, and the 1 lines connected to the gates with the noncarry outputs of the third and fourth binaries. The timing waveforms of a decade are shown in FIG. 3, with the noncarry transitions indicated by the carets. The outputs of the AND gates 27—34 are combined at an OR gate 35 to provide the output pulse train from the rate multiplier. It is readily seen that the output of the rate multiplier is a series of pulses having an average rate equal to the product of the pulse rate at the input to the first counter and the multiplier input to the AND gates.

For example, consider the circuit of FIG. 2, with a multiplier input of 45.

$$M_B = 1+1+2+0 \text{ and } M_A = 0+0+0+5$$

$$f_{out} = \left(\frac{10}{100} + \frac{10}{100} + \frac{20}{100} + 0\right) f_{in} + \left(0+0+0+\frac{5}{100}\right) f_{in} = \left(\frac{40}{100} + \frac{5}{100}\right) f_{in} = .45 f_{in}$$

While FIG. 1 illustrates a six-decade system and FIG. 2 illustrates a two-decade rate multiplier, it should be kept in mind that any number of decades can be utilized in the system.

FIG. 4 illustrates the use of the invention in the measurement of elapsed time, the calculation of the reciprocal of elapsed time, and the calculation of velocity. The system of FIG. 4 also illustrates the sharing of components, such as the clock source for providing both the input to the rate multiplier and the input to the counter which in turn serves as the source for the denominator. Components corresponding to those of FIG. 1 are identified by the same reference numerals.

A counter 40, which may be conventional in design, has an input pulse source which may be self-contained, but preferably is supplied from the clock source 10. A count is initiated by a start signal and is terminated by a stop signal. The signals could be generated by pushbuttons or other conventional mechanisms. In the embodiment illustrated, the start signal is provided by the first sensor 41 and a stop signal by a second sensor 42. Sensors 41, 42 are spaced apart a predetermined distance $s$. Each sensor produces a control signal when an object passes the sensor. With this arrangement, the counter 40 is actuated for the period of time required for an object moving along the path 43 to traverse the distance $s$ between the sensors 41, 42.

In the operation of the system of FIG. 4 for determination of the velocity of the object, a number corresponding to the distance $s$ is set in the numerator source 14. The control gate 20 is in the reset state with the gate 16 closed. When the object passes the sensor 41, a start pulse actuates the counter 40. When the object passes the sensor 42, a stop pulse terminates the count. The count state is the denominator $M$ and corresponds to the transit time $\Delta_t$. The count state of the counter 40 is coupled to the rate multiplier 11 through a translator 45 which serves to convert the code of the counter, typically 1-2-4-8 or 1-2-2-4, to the desired 1-1-2-5 code. The pulse from the sensor 42 also serves as the start command for the control gate 20, changing it to the set state and opening the gate 16. The rate multiplier and preset counter function as described above. When there is coincidence at the preset counter, the control gate 20 is reset, closing the gate 16. The count state in the rate multiplier is the ratio $N/M$ or distance/time or velocity of the object as it moves between the sensors 41, 42.

The following is an example of a determination of average velocity using the system of FIG. 4. Suppose a projectile is fired through two sensing coils 41 and 42 spaced 300-feet apart. Suppose also that the traverse time $\Delta_t$ measured by the counter 40 is ⅛ second or 125,000 $\mu$ sec. when its stop gate is closed. The pulse rate from the clock source 10 may be 1 mc./sec. The number 125,000 is transferred as the $M$ input to the BCD rate multiplier, and the output frequency of the rate multiplier is 1,000,000 c/sec. (from the clock source 10) times .125000 or 125,000 c/sec.

This pulse output is fed to the preset counter 12 which has been preset so that the numerator $N$ is equal to the distance S, in this case 300 feet. The preset counter reaches coincidence and produces an output pulse in 30,000/125,000 sec., or .240000 sec., at which instant it causes the input gate 16 to the rate multiplier to close. Since the gate 16 was open for exactly .240000 sec., the number of pulses admitted from the clock source 10 was 1,000,000 × .24, or 240,000 pulses. By placing the decimal point properly (two places from the right as in the distance S introduced to the preset counter), we now read 2400.00, which is the average velocity of the projectile in feet per second.

FIG. 5 illustrates another embodiment of the invention particularly suited for determining reciprocals, such as the reciprocal of an unknown frequency $f_x$. The system of FIG. 5 also illustrates the sharing of the clock source and of the decade divider, with the latter serving as the time base for the denominator source counter and as the preset counter. Components corresponding to those of FIGS. 1 and 4 are identified by the same reference numerals.

A counter 50 serves as the denominator source and has a pulse source of unknown frequency $f_x$ connected to the counter input through an AND gate 51. The AND gate 51 is on when an input control gate 52 is in the set condition. The clock source 10 is connected as an input to the rate multiplier 11 through AND gate 16 and is also connected as an input to a decade divider 53 through an AND gate 54 and an OR gate 55. The output of the rate multiplier 11 is also connected as an input to the decade divider 53 through an AND gate 56 and the OR gate 55.

The system of FIG. 5 has two modes of operation, referred to as mode A and mode B. A mode control flip-flop 57 provides for mode A operation when in the set state and mode B operation when in the reset state. Initially the gates 20 and 52 and the flip-flop 57 are in the reset state. An operating cycle is initiated by flipping the flip-flop 57 to the set state, as by applying a positive voltage pulse via start switch 60. The flip-flop 57 initiates action in mode A by switching the gate 52 to the set state, thereby connecting the unknown source of frequency $f_x$ as an input to the counter 50, through the gate 51. At the same time, the clock source is connected as an input to the decade divider 53 through the gates 54, 55. The decade divider 53 produces an output pulse for each $N$ input pulse, with $N$ being equal to $1 \times 10^n$, with $n$ representing the number of decades in the divider. An output pulse on the decade divider switches the flip-flop 57 to the reset state and changes the system to mode B operation. The control gate 52 is switched to the reset state, closing gates 51 and 54 and terminating the action of the counter 50. The count state of the counter 50 is the denominator $M$ and corresponds to the unknown frequency expressed in pulses or cycles times a factor which depends upon the duration of the count. The change to mode B also switches the gate 20 to the set condition and opens the gate 16, connecting the clock source 10 as an input to the rate multiplier. The gate 56 is also opened, connecting the rate multiplier output through the gate 55 as an input to the decade divider 53. The decade divider now operates as a preset counter in the manner described in conjunction with the system of FIG. 1. The output pulse on the decade divider switches the control gate 20 and the mode control flip-flop 57 to the reset state, terminating the cycle of operation. The count state of the rate multiplier now represents the reciprocal of the unknown frequency $f_x$.

While the system of FIG. 5 provides for the sharing of pulse sources, decade dividers and control devices, it is readily seen that the same results could be achieved with separate modules for the various functions.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. In a system for computing the ratio of two input decimal numbers comprising a numerator and a denominator, the combination of: said A binary coded decimal rate multiplier including a counter and means for indicating the count state of said counter and including a first input for a series of input pulses directed to said counter, a second input for the denominator, and an output, with the denominator presented in a 1-1-2-5 binary code, and with said output comprising a series of pulses having an average rate equal to the product of the first input pulse rate and the denominator;

a binary coded decimal preset counter with said multiplier output as the counter input and including means for presetting to the numerator and producing an output pulse when the input count corresponds to the preset numerator; and control means having said preset counter output pulse as an input, for connecting a series of input pulses to said first input of said multiplier on receipt of a start command and disconnecting said input series when said preset counter output pulse occurs, with the ratio of the numerator and denominator being the count state of said multiplier counter when said input series is stopped.

2. A system as defined in claim 1 in which the numerator is a multiple of ten and the ratio is the reciprocal of the denominator.

3. A system as defined in claim 1 in which said rat multiplier counter includes a plurality of 1-2-4-8 coded decades connected in cascade.

4. A system as defined in claim 1 in which said rate multiplier counter includes a plurality of 1-2-2-4 coded decades connected in cascade.

UNITED STATES PATENT OFFICE
CERTIFICATE OF CORRECTION

Patent No. 3,566,096 Dated February 23, 1971

Inventor(s) Harry B. Schultheis, Jr.

It is certified that error appears in the above-identified patent and that said Letters Patent are hereby corrected as shown below:

Column 2: Line 57, "$10^{-m)}$" should read --$10^{-m}$)--, enlarging parenthesis;
Line 73, "desired" is misspelled.

Column 3: Line 16 "10n" should read --$10^{n}$--;
Line 32, "these" should read --These--;
Line 36, "and" should read --output--.

Column 6: Line 7, "said" after colon should be deleted;
Line 8, "A" should read --a--;
Line 33, "rat" should read --rate--.

Signed and sealed this 29th day of June 1971.

(SEAL)
Attest:

EDWARD M.FLETCHER,JR.
Attesting Officer

WILLIAM E. SCHUYLER,
Commissioner of Patent

FORM PO-1050 (10-69)